United States Patent [19]

Sheehan

[11] Patent Number: 4,990,721
[45] Date of Patent: Feb. 5, 1991

[54] ARMORED CABLE CONNECTOR
[75] Inventor: Robert K. Sheehan, Cincinnati, Ohio
[73] Assignee: Corecon Corporation, Cincinnati, Ohio
[21] Appl. No.: 464,457
[22] Filed: Jan. 12, 1990
[51] Int. Cl.$^5$ ............................................. H02G 3/06
[52] U.S. Cl. ................................. 174/65 R; 285/162
[58] Field of Search .................. 174/65 R; 285/162; 248/56; 403/194, 195, 201

[56] References Cited

U.S. PATENT DOCUMENTS

| | | | |
|---|---|---|---|
| 1,106,761 | 8/1914 | Weikert et al. | 285/162 |
| 2,659,765 | 11/1953 | Dunn. | |
| 2,869,905 | 1/1959 | Bratz | 403/290 |
| 2,945,085 | 1/1960 | Billups | 174/153 G |
| 2,973,212 | 2/1961 | Rose | 285/159 |
| 3,183,297 | 5/1965 | Curtiss | 174/65 R |
| 3,369,071 | 2/1968 | Tuisku | 174/65 R |
| 3,746,373 | 7/1973 | Prudente | 285/162 |
| 3,814,467 | 6/1974 | Van Buren, Jr. | 285/92 |
| 3,858,151 | 12/1974 | Paskert | 285/162 X |
| 4,012,578 | 3/1977 | Moran et al. | 174/51 |
| 4,021,604 | 5/1977 | Dola et al. | 174/65 R X |
| 4,156,103 | 5/1979 | Dola et al. | 174/65 R |
| 4,366,344 | 12/1982 | Sheehan | 174/65 R |
| 4,619,332 | 10/1986 | Sheehan | 174/65 R |

Primary Examiner—Leo P. Picard
Assistant Examiner—David A. Tone
Attorney, Agent, or Firm—Wood, Herron & Evans

[57] ABSTRACT

The present invention is directed to an armored cable connector having resilient flanges carried by opposed wings and which flex when the wings are pivoted towards one another to grippingly engage therebetween an armored cable conduit of any size within a range of sizes defined by the connector characteristics. The connector includes snap-acting lock structure on the wings to positively lock the wings closed as they are pivoted together.

35 Claims, 2 Drawing Sheets

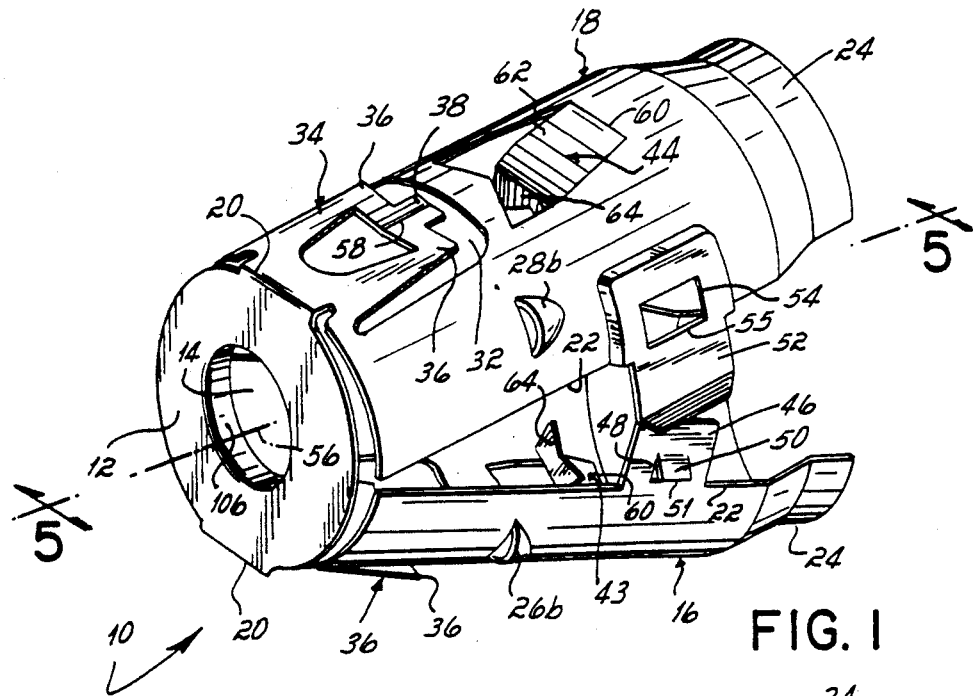
FIG. 1
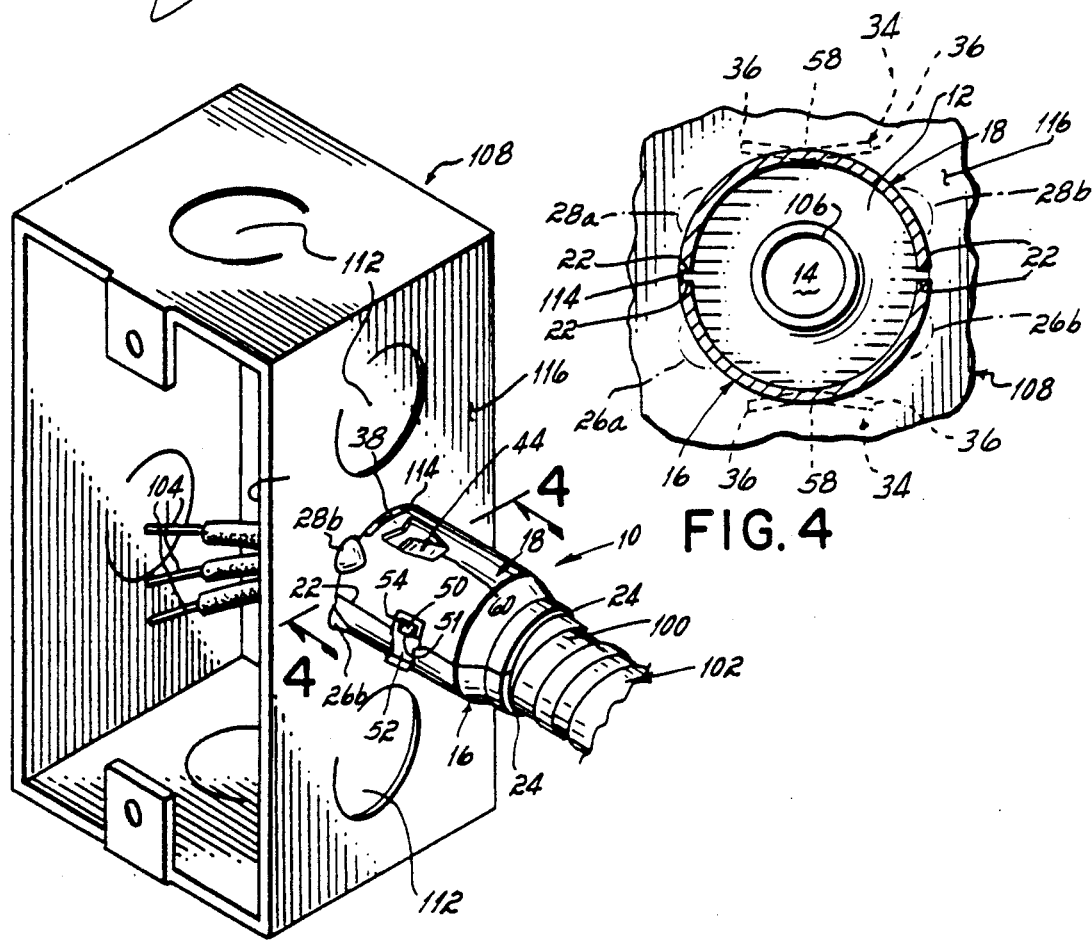
FIG. 4
FIG. 2

4,990,721

ARMORED CABLE CONNECTOR

FIELD OF THE INVENTION

This invention relates to a connector for armored cable by which the cable conduit is secured to a junction box or similar device having a hole in a wall thereof through which conductors pass for connection to terminals or other conductors.

BACKGROUND OF THE INVENTION

Armored cable connectors commonly in use are die cast assemblies which have a body that is inserted through a hole in the wall of a junction box and which is threaded so that a nut can be threaded onto the portion of the body on the inside of the junction box wall to secure the body tightly to the junction box wall. Such connectors may further include a cap which is secured to the body member with screws to clamp the armored cable conduit between the body and the cap. This type of connector has several drawbacks. Installation may take a good deal of time and manipulation of the various components of the connector may be tedious and frustrating, particularly in difficult to reach locations such as overhead junction boxes. Additionally, vibration tends to loosen the nut, which may cause the connector to pull away from the junction box, thereby giving rise to a potentially dangerous situation.

Many alternative connectors have been proposed; the most desirable to date I believe to be the single-piece armored cable connectors shown in my prior U.S. Pat. Nos. 4,366,344 and 4,619,332. The connectors theredescribed allow the conduit to be rapidly and reliably connected to the junction box without screws or nuts. For example, with the right-angle connector disclosed in my U.S. Pat. No. 4,366,344, the armored cable conduit is simply laid into the open channel of the connector and the connector urged against the junction box whereupon barbs in the connector engage the junction box wall and secure the cable longitudinally along the junction box wall. The connector disclosed in my U.S. Pat. No. 4,619,332, has a rearwardly tubular section comprised of resilient wings which when urged together fit threadably within the interior of a helically grooved metallic conduit and thereafter bear outwardly against the interior wall of the armored cable conduit to thereby grip the conduit. The connector then mounts to the junction box wall by a second pair of resilient wings which engage the junction box wall. While each of my foregoing connectors is believed to provide advantages over prior armored cable connectors, they are somewhat limited in that different sized connectors must be used for different sized armored cables.

SUMMARY OF THE INVENTION

In accordance with the principles of the present invention, I provide a one-piece armored cable connector which advantageously connects armored cable of any size within a range of sizes to a junction box, thereby eliminating the need for different connectors for the different sized cables. To this end, the present invention provides such a connector in which a pair of resilient wings extend from a center support ring and are normally spaced apart in an open position and pivotable towards one another to a closed position, each wing including an integral resilient flange extending therefrom and towards the other flange to resiliently engage the exterior wall of an armored cable conduit situated between the distal ends of the flanges as the wings are pivoted from the open to the closed position. The resilient flanges flex or yield as they are driven against the conduit exterior wall by pivoting of the wings from the open towards the closed position so as to allow the wings to pivot to the closed position irrespective of the size of the conduit within a range of sizes.

In a preferred embodiment, the resilient flanges are each generally L-shaped, and attached at its base or leg end to the wing with the foot or distal end free to engage the armored cable conduit exterior wall. The bend in the flange defining the L-shape is preferably slightly canted or angled relative to a plane transverse the longitudinal axis of the connector so as to correspond generally with the angle or cant of the groove of the helical grooves typically provided in armored cable. Additionally, the flanges are preferably longitudinally offset so as to fit within the grooves of such an armored cable.

In accordance with the principles of the present invention, the connector retains a cable of any size within a range of sizes defined by the characteristics of the connector, preferably in the closed position. Thus, when the connector is in the closed position, and since the flanges may preferably flex or yield substantially all the way to the wings, the spacing between the wings in the closed position corresponds to a maximum diameter armored cable which may be retained therein. Similarly, when the connector is in the closed position, and without a conduit engaged therein, the spacing between the distal ends of the flanges fully extended defines a minimum diameter armored cable which may be retained therein.

In a preferred embodiment, the connector of the present invention securely holds armored cable of any size between 10/2 and 14/3. In the closed position of the preferred embodiment, the distal ends of the flanges are normally spaced apart approximately 0.22 and the spacing between the wings is approximately 0.60 inches, allowing the connector to receive and retain armored cable sizes between about 0.22 inches and about 0.60 in diameter.

In accordance with a further feature of the present invention, the wings include snap-acting locking structure which locks the wings into the closed position with a positive snap-lock action as the wings are pivoted together thereby eliminating the need to manipulate screws or nuts or other retaining structure to secure the cable in the connector. In a preferred embodiment, the wings cooperate to define two halves of a tubular body with the snap-acting locking structure extending from adjacent edges of the tubular body halves. Such snap-acting locking structure is preferably provided by a slot adjacent the edge of one wing and a projecting tang on the opposed edge of the other wing which cooperatively engage one another to snap-lock the wings in the closed position as the wings pivot into the closed position and whereupon a conduit situated between the flanges will be firmly gripped and retained therein by the resilient flanges.

The connector further preferably may be mounted to the junction box wall by resilient tabs extending from the connector center support ring and lugs on the wings which cooperate with the tabs to trap the junction box wall therebetween.

As a result of the foregoing, there is thus provided a connector capable of connecting to a junction box an armored cable having a size which falls within a range of sizes, between a minimum and a maximum, as defined by the characteristics of the connector.

These and other features and advantages of the present invention shall be made apparent from the accompanying drawings and the description thereof.

BRIEF DESCRIPTION OF THE DRAWINGS

The accompanying drawings, which are incorporated in and constitute a part of this specification, illustrate a preferred embodiment of the invention and, together with the general description of the invention given above and the detailed description of the preferred embodiment given below, serve to explain the principles of the invention.

FIG. 1 is a perspective view of the connector of the present invention in the open position;

FIG. 2 is a perspective view of the connector of FIG. 1 in the closed and locked position with a helically-grooved armored cable conduit secured therein and the connector secured to a junction box;

FIG. 4 is a cross-sectional view taken along line 4—4 of FIG. 2; and

DETAILED DESCRIPTION OF THE INVENTION

Figures 3, 5, 6:
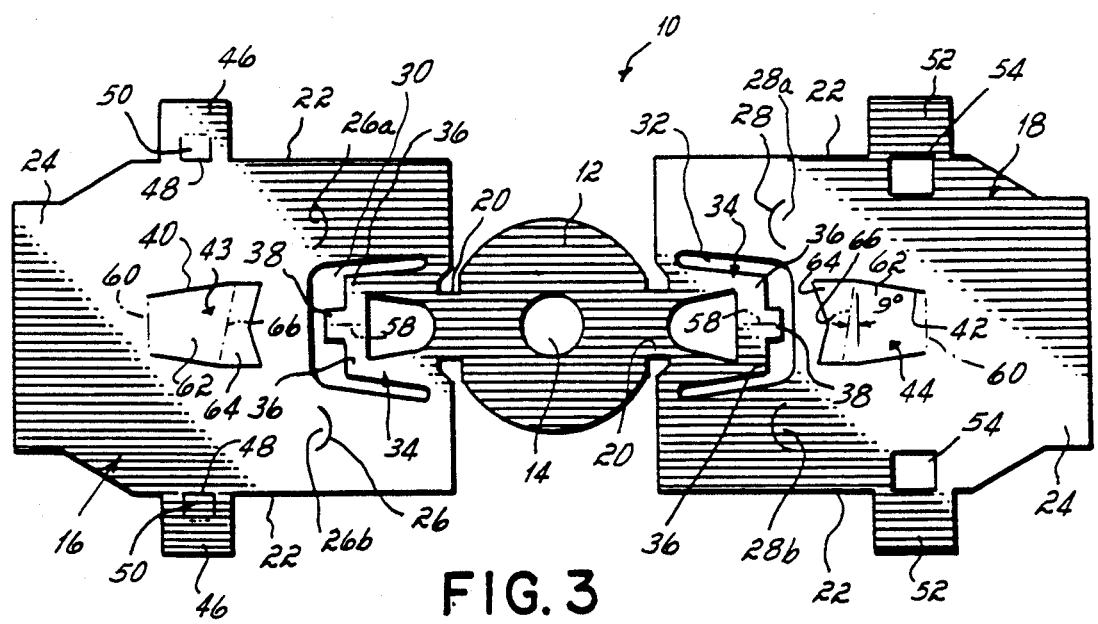
FIG. 3 is a plan view of a stamped flat blank prior to being formed into the connector of FIG. 1.
FIGS. 5 and 6 are cross-sectional views taken along line 5—5 of FIG. 1 with FIG. 5 showing the connector in the open position and with a helically-grooved armored cable conduit in proximity thereto and FIG. 6 showing the connector in the closed and locked position with the conduit secured therein.

Referring to FIG. 1, the connector of the present invention is indicated at 10 and consists of a sheet metal stamping formed from a single piece of sheet metal. In practice, the connector is preferably formed from a ribbon of 0.025 C.R.S. 1075 spring steel (heated to spring temper and having a 0.0003 zinc plate finish) which is fed through a sequence of stamping dies until it attains the configuration shown in FIG. 1. FIG. 3 shows connector 10 as a blank stamping. The blank of FIG. 3 may be formed into a connector having the configuration shown in FIG. 1 by means of a progressive die employing skills commonly held by those in the art.

As can more easily be seen in FIG. 3, the stamping which makes up connector 10 includes a center support ring 12 with a hole 14 therethrough. Extending to the left and right from center ring 12 are projections 16 and 18, respectively, joined to ring 12 as at 20 and having side edges 22 and distal reduced dimension portion 24. Center ring 12 has a diameter slightly smaller than the diameter of a standard junction box knock-out hole. Projections 16 and 18 include cuts 26 and 28 at which projections may be upstruck to form lugs 26a and b and 28a and b, respectively. Projections 16 and 18 further include notches 30, 32 cut out therefrom to define engaging tabs 34 adjacent center support 12 having substantially square shoulders 36 and secondary tab portions 38 for purposes to be described hereinafter.

Projections 16 and 18 each further include a cut 40 or 42 at which projections 16 and 18, respectively, may be bent out to define L-shaped flanges 43 and 44 (FIG. 5) for purposes also to be subsequently described. Finally, each projection 16, 18 includes locking structure along its side edges 22 adjacent distal portion 24 to provide a snap-acting lock action of connector 10 as will be described. The locking structure associated with each edge 22 of projection 16 is defined by an extending tab 46 with a cut 48 therein from which may be upstruck tang or barb 50. Similarly, the locking structure associated with each edge 22 of projection 18 is defined by an extending tab 52 and generally square aperture 54 positioned in projection 18 to receive a tang 50 and snap-lock the wings closed.

With reference to FIGS. 1 and 5, it may be seen that the stamping of FIG. 3 is to be formed such that projection 16, 18 extend rearwardly from center support 12 to define a pair of tubular wings which are normally urged apart in an open position such that edges 22 each define an angle of about 10°, for example, to the longitudinal axis of connector 10 indicated at 56 (FIG. 5). Wings 16, 18 are pivotable about junctions 20 towards one another such that edges 22 of the wings abut one another to define a closed position of connector 10 (as seen in FIGS. 2, 4 and 6) such that the wings define two halves of a tubular body having a minimum diameter defined by reduced dimension portion 24. Also apparent from FIGS. 1 and 5 are lugs 26a, b and 28a, b formed at cuts 26 and 28, respectively, and engaging tabs 34 which are preferably folded slightly along phantom fold line 58 (FIG. 3) such that square shoulders 36 lie outwardly of the radial or tubular surface of wings 16, 18 (and as shown in dotted line in FIG. 4).

Locking tabs 46 form a continuation of projection 16 beyond edge 22 wing tangs 50 extending outwardly therefrom. Similarly, a portion of wing 18 adjacent each aperture 54 is struck out from wing 18 and extends into associated tab 52 to define a receiving zone for a tab 56 to allow tang 50 to pass into aperture 54. The cooperation of the locking structure on each wing 16 and 18 provides a snap-action lock to positively lock wings 16 and 18 in the closed position as the wings are pivoted together. Due to the resilient nature of the spring steel, wings 16 and 18 will tend to be urged apart to their original open position. Consequently, as the wings are pivoted together, exposed edge 51 of tang 50 pops or snaps through aperture 55 and, when the wings are released, the bias normally urging the wings apart caused edge 51 to bear against bottom ledge 55 of slot 54 and maintain wings 16 and 18 locked together.

In order to engage variously sized armored cables, yieldable structure is provided in wings 16, 18 to exteriorly engage and hold a cable situated between the wings. To this end, flanges 43, 44 are provided by bending inwardly along phantom line 60 adjacent cut 40 or 42, respectively, (FIG. 3) so that each flange extends from its associated wing and towards the other flange and wing. Preferably, each flange 43, 44 is L-shaped and attached at its leg end 62 to its associated wing leaving the distal or foot end 64 free whereby each flange may flex or yield as its foot 64 encounters resistance. Leg 62 of each flange 43, 44 is preferably bent inwardly to an angle of about 40° from the surface of its associated wing as seen in FIG. 5. The foot 64 of each flange is preferably angled relative connector 10, the angle provided by bending the distal end of the flange along a line 66 which is slightly canted (about 9°) relative a transverse plane through connector 10 (perpendicular edges 22 as seen in FIG. 3). This slight cant or angle corresponds generally to the angle or cant of helical groove 100 of typical helically-grooved armored cable conduit 102, thus facilitating seating of distal ends 64 of flanges 43, 44 in groove 100. Additionally, the distal ends of the flanges are preferably formed in a shallow V-shape, which conforms generally to the curvature of conduit 102, to provide greater engaging contact between flanges 43, 44 and conduit 102. Further as seen in FIG. 5, flanges 43, 44 are preferably axially offset a distance which corresponds generally to the axial distance helical groove 100 travels along conduit 102 in one-half rotation thereof, further facilitating seating of distal ends 64 in groove 100.

Due to the flexing nature of flanges 43, 44, connector 10 is capable of securing a conduit 102 of any size within a range of sizes. To this end, and as shown in dotted line in FIG. 6, the distance between feet 64 of flanges 43, 44 fully extended and with connector 10 in the closed position defines a minimum diameter conduit which may be received in connector 10. Preferably, that distance is about 0.22 inches. In the event that only one wing is provided with a flange, the other wing will provide a substitute flange in which case the minimum diameter conduit which can be retained by the connector will be defined by the spacing between the one flange and the opposite wing. The maximum diameter conduit receivable in connector 10 is limited defined by the spacing between the wings and, in the embodiment shown, is defined primarily by the diameter of reduced dimension portion 24 of the tubular wings 16, 18 in their closed position. In a preferred embodiment, this diameter is about 0.60 inches. Accordingly, the preferred embodiment of connector 10 is designed to accept armored cables ranging in size between 10/3 and 14/2.

With reference to FIG.. 2, there is shown a junction box 108 having a plurality of knock-outs 112, any one of which could be removed to form a standard-sized hole, such as hole 114, through the wall 116 of junction box 108. Since knock-outs 112 and the holes which result when they are removed are of a standard size in the industry, connector 10 is preferably formed such that in the closed position it has an outer diameter adjacent ring 12 slightly smaller than the diameter of hole 114 so that the forwardly end of connector 10 is slidably receivable through hole 114. Once so received, engaging tabs 34 and lugs 26a, b and 28a, b cooperate to hold connector 10 to junction box wall 116 as will be described and thereafter allowing conductors 104 of cable 102 to be inserted into junction box 108.

To facilitate ease of insertion of conductors 104 within conduit 102 through hole 14 in center ring support 12, center ring 12 is preferably provided with a rearwardly-outturned flange 106 for creating a smooth inner surface. Outturned flange 106 thus provides a sort of funnel through which conductors 104 can be guided through hole 14 of center ring 12 and into junction box 108 without any rough abrading edges to damage conductors 104. As is conventional, conduit 102 may be provided with a smooth, flexible plastic sleeve 110 to protect conductors 104 from any rough, abrading edges of conduit 102.

In use, an armored cable such as helically-grooved metallic conduit 102 is inserted into open connector 10 in the direction of arrow A as seen in FIG. 5 between wings 16 and 18 and the distal ends of flanges 43 and 44. Wings 16, 18 are then pivoted towards one another such as by squeezing them together by hand as with pliers until flange feet 64 engage an outer wall portion 118 of conduit 102, preferably in groove 100 thereof. Thereafter, as wings 16 and 18 are further pivoted together, flanges 43, 44 yield by flexing outwardly towards their associated wing while bearing against wall portion 118 of conduit 102. As wings 16, 18 approach their closed position, tabs 50, 52 on the wing edges 22 cooperate to provide a snap-action lock in that tangs 50 pop into aperture 54 and positively lock connector 10 in the closed position (FIG. 6). Flanges 43, 44 exert an inward clamping force against wall portion 118 of conduit 102 when connector 10 is locked therearound. Preferably, distal ends 64 are seated in groove 100 to thereby retain conduit 102 in connector 10 as seen in FIG. 6. Thereafter, as seen in FIG. 2, connector 10 is inserted, center ring support 12 first, through hole 114 in wall 116 of junction box 108 until engaging tabs 34 pass through sufficiently to allow shoulders 36 to flex outwardly of the boundary of hole 114 within box 108 with secondary tabs 38 still within hole 114 (FIG. 4). At about that point, lugs 26a, b and 28a, b abut the exterior of wall 116 whereby tabs 34 and lugs 26a, b, 28a, b secure connector 10 to junction box wall 116. Secondary tab portions 38 of tabs 34 engage the boundary of hole 114 when shoulders 36 flex outwardly so as to prevent tabs 34 from being bent out from wings 16 and 18 and thereby losing their hold on wall 116 of junction box 108.

Removal of connector 10 from junction box wall 108 can be accomplished by simultaneously gripping engaging tabs 34 as with pliers to apply pressure to squeeze or flex them inwardly while pulling rearwardly on connector 10 to release it from hole 114.

While the present invention has been illustrated by description of a preferred embodiment and while the preferred embodiment has been described in considerable detail, it is not the intention of applicant to restrict or in any way limit the scope of the appended claims to such detail. Additional advantages and modifications will readily occur to those skilled in the art. For example, the connector of the present invention may include an alternative means for engaging the junction box wall, of the type disclosed in my U.S. Pat. No. 4,619,332, the specification of which is hereby incorporated herein by reference. Additionally, although in the preferred embodiment the connector of the present invention is shown in use with a helically-grooved armored cable, it should be appreciated that the connector can be used with smooth metallic conduit, BX cable or other similar commonly used cable conduit. The invention in its broader aspects is therefore not to be limited to the specific details, representative apparatus, and illustrative example shown and described. Accordingly, departures may be made from such details without departing from the spirit or scope of applicant's general inventive concept.

What is claimed is:

1. A connector for mounting an electrical conduit of any size within a range of sizes to a junction box wall, comprising:

a one piece member having a center support and a pair of wings extending from said center support, said wings being normally urged apart in an open position, said wings being pivotable toward one another into a second position;

yieldable means normally unflexed and extending from at least a first of said wings and toward a second of said wings for engaging an exterior wall of an electrical conduit situated between said yieldable means and said second wing, said yieldable means flexing towards said first wing after engaging the conduit exterior wall as the wings are pivoted from said open position to said second position, whereby to accommodate an electrical conduit of any size within a range of sizes defined by characteristics of the connector;

means for retaining said wings in said second position; and junction box engaging means for mounting the connector to a junction box.

2. The connector of claim 1, a characteristic of the connector being a distance between said yieldable means when it is unflexed and said second wing with the connector in said second position, said characteristic defining a minimum to the range of sizes.

3. The connector of claim 1, a characteristic of the connector being a distance between said wings with the connector in said second position, said characteristic defining a maximum to the range of sizes.

4. The connector of claim 1, said yieldable means including an L-shaped tab attached at its leg end to said first wing and extending therefrom when unflexed at an angle relative said first wing, said L-shaped tab having a transversely angled bend adjacent its distal end to define a free foot end, said L-shaped tab flexing as its free foot end bears against the conduit exterior wall.

5. The connector of claim 4, a characteristic of the connector being a distance between said free foot end when the L-shaped tab is unflexed and said wing with the connector in said second position, said characteristic defining a minimum to the range of sizes.

6. The connector of claim 4, said leg end extending when unflexed from said first wing at an angle of about 40° relative said first wing.

7. The connector of claim 4, said free foot end being angled about 9° relative to a transverse plane through the connector.

8. A connector for mounting an electrical conduit of any size within a range of sizes to a junction box wall, comprising:
   a one piece member having a center support and a pair of wings extending from said center support, said wings being normally urged apart in an open position, said wings being pivotable toward one another into a second position;
   a pair of yieldable means each normally unflexed and extending from a respective said wing and towards each other for engaging an exterior wall of an electrical conduit situated between said wings, said yieldable means flexing towards its respective wing after engaging the conduit exterior wall as the wings are pivoted from said open position to said second position, whereby to accommodate an electrical conduit of any size within a range of sizes defined by characteristics of the connector;
   means for retaining said wings in said second position; and
   junction box engaging means for mounting the connector to a junction box.

9. The connector of claim 8, a characteristic of the connector being a distance between said pair of yieldable means when they are unflexed with the connector in said second position, said characteristic defining a minimum to the range of sizes.

10. The connector of claim 8, a characteristic of the connector being a distance between said wings with the connector in said second position, said characteristic defining a maximum to the range of sizes.

11. The connector of claim 8, each said yieldable means including an L-shaped tab attached at its leg end to its respective wing and extending therefrom at an angle relative said respective wing, each said tab having a transversely angled bend adjacent its distal end to define a free foot end, each said L-shaped tab flexing as its free foot end bears against the conduit exterior wall.

12. The connector of claim 11, a characteristic of the connector being a distance between said free foot end of each said tab when said tabs are unflexed and with the connector in said second position, said characteristic defining a minimum to the range of sizes.

13. The connector of claim 11, each said leg end extending when unflexed from its respective wing at an angle of about 40° relative said respective wing.

14. The connector of claim 11, each said free foot end being angled about 9 relative to a transverse plane through the connector.

15. The connector of claim 11, each free foot end being axially offset from one another a distance corresponding to an axial distance a helical groove of an electrical conduit having such a groove travels in one-half rotation thereof, whereby to seat said free foot ends in the helical groove.

16. A connector for mounting an electrical conduit for carrying conductors to a junction box, comprising:
   a one-piece member having a center support and a pair of wings extending from said center support, said wings being normally urged apart in an open position, said wings being pivotable toward one another into a closed position;
   normally unflexed, yieldable means between said wings for engaging an exterior wall of an electrical conduit situated between said wings, said yieldable means flexing towards at least one of said wings after engaging the conduit exterior wall as the wings are pivoted from said open position to said closed position;
   snap-acting locking means on said wings for locking said wings together in said closed position with a positive snap-lock action as said wings are pivoted from said open position to said closed position, whereby to retain the electrical conduit in the connector; and
   junction box engaging means for mounting the connector to a junction box.

17. The connector of claim 16, said wings defining a generally tubular structure when the connector is in said closed position, each said wing having an edge, said edge of a first of said wings being adjacent said edge of a second of said wings when the connector is in said closed position.

18. The connector of claim 17, said snap-acting locking means including an aperture proximate said first wing edge and a tang projecting proximate said second wing edge, said aperture and said tang positioned such that said tang pops into said aperture as said wings are pivoted from said open position to said closed position.

19. The connector of claim 17, said edge each being at an angle of about 10 relative a longitudinal axis of the connector when the connector is in said open position.

20. The connector of claim 16, said yieldable means including a pair of L-shaped flanges each attached at its leg end to a respective said wing and extending therefrom when unflexed at an angle relative its respective wing, each said tab having a transversely angled bend adjacent is distal end to define a free foot end, each said L-shaped tab flexing as its free foot end bears against the conduit exterior wall.

21. The connector of claim 20, each said leg end extending when unflexed from its respective wing at an angle of about 40° relative said respective wing.

22. The connector of claim 20, each said free foot end being angled about 9° relative to a transverse plane through the connector.

23. The connector of claim 20, each free foot end being axially offset from one another a distance corresponding to an axial distance a helical groove of an electrical conduit having such a groove travels in one-half rotation thereof, whereby to seat said free foot ends in the helical groove.

24. A connector for mounting an electrical conduit of any size within a range of sizes to a junction box wall, comprising:
- a one piece member having a center support and a pair of wings extending from said center support, said wings being normally urged apart in an open position, said wings being pivotable toward one another into a closed position;
- a first L-shaped tab attached at its leg end to a first of said wings and extending therefrom when unflexed at an angle relative said first wing, said first L-shaped tab having a transversely angled bend adjacent its distal end to define a free foot end, said first L-shaped tab flexing as its free foot end bears against a surface;
- a second L-shaped tab attached at its leg end to a second of said wings and extending therefrom when unflexed at an angle relative said second wing, said second L-shaped tab having a transversely angled bend adjacent its distal end to define a free foot end, said second L-shaped tab flexing as its free foot end bears against a surface, said first and second L-shaped tabs extending towards one another when unflexed such that each said tab flexes towards its respective wing after engaging an exterior wall of an electrical conduit therebetween as said wings are pivoted from said open position to said closed position, whereby to accommodate an electrical conduit of any size within a range of sizes defined by characteristics of the connector in a closed position;
- snap-acting locking means on said wings for locking said wings together in said closed position with a positive snap-lock action as said wings are pivoted from said open position to said closed position, whereby to retain the electrical conduit in the connector; and
- junction box engaging means for mounting the connector to a junction box.

25. The connector of claim 24, a characteristic of the connector being a distance between said free foot end of each said tab when said tabs are unflexed and with the connector in said closed position, said characteristic defining a minimum to the range of sizes.

26. The connector of claim 24, a characteristic of the connector being a distance between said wings with the connector in said closed position, said characteristic defining a maximum to the range of sizes.

27. The connector of claim 24, each said leg end extending when unflexed from its respective wing at an angle of about 40 relative said respective wing.

28. The connector of claim 24, each said free foot end being angled about 9 relative to a transverse plane through the connector.

29. The connector of claim 24, each free foot end being axially offset from one another a distance corresponding to an axial distance a helical groove of an electrical conduit having such a groove travels in one-half rotation thereof, whereby to seat said free foot ends in the helical groove.

30. The connector of claim 24, said wings defining a generally tubular structure when the connector is in said closed position, each said wing having an edge, said edge of a first of said wings being adjacent said edge of a second of said wings when the connector is in said closed position.

31. The connector of claim 30, said snap-acting locking means including an aperture proximate said first wing edge and a tang projecting proximate said second wing edge, said aperture and said tang positioned such that said tang pops into said aperture as said wings are pivoted from said open position to said closed position.

32. The connector of claim 30, said edge each being at an angle of about 10° relative a longitudinal axis of the connector when the connector is in said open position.

33. The connector of claim 24, said junction box engaging means including at least one resilient engaging tab extending from said center support and at least one lug upstruck from said wing, said tab and said lug spaced apart to capture therebetween a junction box wall, said engaging tab having a secondary projection being situated within a junction box hole when the junction box wall is captured whereby to retain integrity to said engaging tab.

34. In combination, an electrical junction box having at least one wall and at least one hole in said wall;
- a connector resiliently secured to said junction box wall and extending through said junction box hole;
- an electrical conduit for carrying electrical conductors, said conduit retained in said connector;
- said connector including:
  - a one-piece member having a center support and a pair of wings extending from said center support, said wings being normally urged apart in an open position, said wings being pivotable toward one another into a closed position;
  - normally unflexed yieldable means between said wings and flexed against an exterior wall of said electrical conduit, said electrical conduit situated between said wings, said yieldable means being flexed towards at least one of said wings after engaging the conduit exterior wall as the wings were pivoted from said open position to said closed position, whereby said connector accommodates the conduit being of any size within a range of sizes defined by characteristics of said connector;
  - snap-acting locking means on said wings for locking said wings together in said second position with a positive snap-lock action as said wings are pivoted from said open position to said closed position, whereby to retain said electrical conduit in said connector; and
  - junction box engaging means for resiliently securing said connector to said junction box.

35. The combination of claim 34, said junction box engaging means including at least one resilient engaging tab extending from said center support and at least one lug upstruck from said wing, said tab and said lug spaced apart to capture therebetween a junction box wall, said engaging tab having a secondary projection being situated within a junction box hole when the junction box wall is captured whereby to retain integrity to said engaging tab.

* * * * *

UNITED STATES PATENT AND TRADEMARK OFFICE
CERTIFICATE OF CORRECTION

PATENT NO. : 4,990,721

DATED : February 5, 1991

INVENTOR(S) : Robert K. Sheehan

It is certified that error appears in the above-identified patent and that said Letters Patent is hereby corrected as shown below:

| | |
|---|---|
| Column 8, Line 12 | "9" should be --9°-- |
| Column 8, Line 56 | "10" should be --10°-- |
| Column 9, Line 60 | "40" should be --40°-- |
| Column 9, Line 63 | "9" should be --9°-- |

Signed and Sealed this

Twentieth Day of October, 1992

Attest:

DOUGLAS B. COMER

Attesting Officer

Acting Commissioner of Patents and Trademarks